United States Patent [19]

Hertel

[11] Patent Number: 4,591,359

[45] Date of Patent: May 27, 1986

[54] PROCESS FOR PREPARING ACID NITRO DYESTUFFS FOR LEATHER

[75] Inventor: Hasso Hertel, Mulheim am Rheim, Fed. Rep. of Germany

[73] Assignee: Hoechst Aktiengesellschaft, Fed. Rep. of Germany

[21] Appl. No.: 643,840

[22] Filed: Aug. 23, 1984

[30] Foreign Application Priority Data

Aug. 27, 1983 [DE] Fed. Rep. of Germany ....... 3330948

[51] Int. Cl.⁴ .......................... D06P 3/32; C07C 87/50
[52] U.S. Cl. ............................................ 8/436; 8/649; 564/431; 564/433; 564/441; 564/442
[58] Field of Search ....................... 564/443, 441, 442; 8/436, 649

[56] References Cited

U.S. PATENT DOCUMENTS 1,059,571  4/1913  Schmidlin .......................... 260/510
1,711,860  5/1929  Schmidlin .............................. 8/436

FOREIGN PATENT DOCUMENTS 3330948  3/1985  Fed. Rep. of Germany .
1468478  3/1977  United Kingdom .

*Primary Examiner*—A. Lionel Clingman
*Attorney, Agent, or Firm*—Connolly and Hutz

[57] ABSTRACT

Acid nitrodyestuffs are prepared by treating aminonitrodiphenylaminesulfonic acids with an oxidizing agent in an aqueous medium, the oxidizing agent being hypochlorous acid or its alkali metal or alkaline earth metal salts and the reaction taking place at above pH 4 and at a temperature between 0° and 100° C. The dyestuffs thus obtainable dye even fresh full chrome grained leather in deep shades.

18 Claims, No Drawings

PROCESS FOR PREPARING ACID NITRO DYESTUFFS FOR LEATHER

British Pat. No. 1,468,478 describes dyestuffs obtained by treating aminonitrodiphenylaminesulfonic acids with magnesium dioxide at above pH 6 and elevated temperatures. They are used for dyeing leather.

The dyeing behavior of leather, then, critically depends on the way it has been tanned. These days the most important tanning method is tanning with chromium salts; after all, according to the literature (for example Ullmanns Encyklopadie der technischen Chemie (Ullmann's Encyclopedia of Chemical Technology), 4th Edition, Volume 16, page 120), about 80% of all the leather produced is at least partially chrometanned. The abovementioned known dyestuffs give deep dyeings on chrome split leather having been dried beforehand, and even on rechromed, vegetable-tanned leather having been dried beforehand; yet on fresh chrome leather, such as, for example, boxcalf, only very pale dyeings can be obtained. This type of leather, which is of immense importance in practice, can accordingly not be satisfactorily dyed with said known dyestuffs.

To improve these dyeing disadvantages, U.S. patent application Ser. No. 608,990 (filed May 10, 1984 by Hasso Hertel) already proposes dyestuffs which are obtained by treating aminonitrodiphenylaminesulfonic acids with manganese(VI) or manganese(VII) compounds as oxidizing agents at above pH 5.

In the course of further development it was likewise found that acid nitro dyestuffs with such improved dyeing properties are obtained when the aminonitrodiphenylaminosulfonic acids are treated with hypochlorous acid or its salts. These dyestuffs produce deep dyeings even on fresh full chrome grain leathers. Compared with the known methods of British Pat. No. 1,468,478, there results moreover on the one hand the economic advantage that the oxidizing agent used is significantly less costly and on the other hand the technical advantage that, owing to the water solubility of the oxidizing agent and the reaction products, it is possible to dispense with a clarifying filtration before the dyestuff is isolated.

The present invention accordingly provides an improved process for preparing acid nitro dyestuffs by treating aminonitrodiphenylaminosulfonic acids with an oxidizing agent in an aqueous medium, this process comprising carrying out the reaction at above pH 4, preferably at pH 5.5–12, and at a temperature between 0° and 100° C., preferably between 20° and 80° C., with hypochlorous acid or one of its alkali metal or alkaline earth metal salts, or a mixture thereof, and also provides the acid nitro dyestuffs obtainable thereby.

After the reaction has ended the dyestuff mixture formed is isolated by spray-drying or by salting out and filtering with suction; in the latter case the required drying can be effected with, for example, a hot air stream. The dyestuff powders obtained can be adjusted to a certain strength by mixing with water-soluble, non-dyeing substances, for example sodium chloride.

Generally in the process according to the invention, one or more aminonitrodiphenylaminesulfonic acids are reacted at above pH 4, preferably pH 5.5–12, and at a temperature between 0° and 100° C., preferably between 20° and 80° C. in aqueous solutions or suspensions with hypochlorous acid or one or more of its alkali metal or alkaline earth metal salts or with a mixture of hypochlorous acid and these hypochlorites.

The hypochlorous acid or its alkali metal or alkaline earth metal salts are preferably used in an amount of 0.2 to 3.5 moles, particularly preferably 0.5 to 2 moles, per mole of aminonitrodiphenylaminesulfonic acid.

The aminonitrodiphenylaminesulfonic acids used as starting compounds can contain, in the two benzene rings, further substituents which are customary for such compounds in the preparation of acid nitro dyestuffs; the substituents of this type are preferably halogen atoms, such as chlorine and bromine atoms, alkyl groups, in particular of 1 to 4 carbon atoms, alkoxy groups, in particular of 1 to 4 carbon atoms, and carboxy groups. The preferred starting compounds in the process according to the invention are aminonitrodiphenylaminesulfonic acids of the general formula (1)

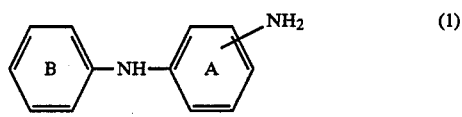

in which the primary amino group bonded to the benzene ring A is in the meta- or para-position relative to the secondary amino group, the benzene ring B is substituted by one or two nitro groups and a sulfo group which are bonded in ortho- and para-positions relative to the secondary amino group on ring B, and the benzene rings A and B can each be additionally substituted by one or two, preferably one, substituent from the group consisting of halogen, such as bromine and in particular chlorine, alkyl of 1 to 4 carbon atoms, such as ethyl and methyl, alkoxy of 1 to 4 carbon atoms, such as ethoxy and methoxy, and carboxy. The primary amino group in the benzene ring A is preferably in the para-position of the diphenylamine.

Examples of aminonitrodiphenylaminesulfonic acids are 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid, 3-amino-4'-nitrodiphenylamine-2'-sulfonic acid, and the compounds substituted in one of the two benzene rings by a halogen atom, such as a chlorine or bromine atom, an alkyl group of preferably 1 to 4 carbon atoms, an alkoxy group of preferably 1 to 4 carbon atoms or a carboxy group.

Hypochlorous acid is only known in the form of an aqueous solution. Even that is not very stable. It is therefore preferable to use the alkali metal or alkaline earth metal salts of hypochlorous acid, in particular potassium hypochlorite, sodium hypochlorite or calcium hypochlorite. It is true that the potassium salt is likewise only known in the form of a solution, but even the sodium and calcium hypochlorites are generally used in the form of aqueous solutions, preferably in the form of chloride-containing solutions as formed as so-called chlorine bleach liquor through the action of chlorine on aqueous alkali metal and alkaline earth metal hydroxide solutions. Sodium hypochlorite is preferably used, in particular in the form of its technical and commercial chlorine bleach liquor. The calcium salt can also be used in the form of chloride of lime bleaching powder, which, in addition to calcium hypochlorite, also mainly contains calcium chloride and calcium hydroxide. Depending on their pH, hypochlorite solutions also contain more or less free hypochlorous acid in a chemical equilibrium whose position is determined by the $pK_a$ of 7.6. At pH 7.6 under ideal conditions equal molar concentrations of hypochlorous acid and hypochlorite are thus present.

The acid nitro dyestuffs which can be obtained according to the invention are very readily soluble in hot and cold water. They are suitable for dyeing leather, in particular for dyeing chrome leather produced by widely differing methods, such as dried chrome leather, for example chrome split leather, fresh chrome leather, for example boxcalf or chrome sized leather, or combination chrome-vegetable-tanned leather such as rechromed vegetable-pretanned sheep leather. They are also highly suitable for dyeing aluminum- or zirconium-tanned leathers. The dyestuffs obtainable according to the invention penetrate well into the leather. Their tinctorial strength is high compared to that of known nitro dyestuffs, and their fastness properties, such as, for example, light fastness, fastness to fat-liquoring, or solvent fastness, are good. The way the dyestuffs are used for dyeing leather, or the way the dyeings are prepared with these dyestuffs, is conventional. Drum-dyeing is a particularly suitable way of preparing the dyeings. In drum-dyeing, the sweetened and wetted-back leather is agitated in a liquor which contains the dyestuff and can, if desired, also contain a small amount of a weak base, such as ammonia, and/or an anionic surfactant. A fat liquor is then added in conventional manner to soften the leather, and after the fat liquor has been incorporated the bath is brought to a weakly acid pH, customarily by means of formic acid. However, it is also possible to prepare brush or spray dyeings using, for example, a dyeing liquor which, in addition to the dyestuff, also contains ammonia, such as about 25% strength aqueous ammonia, an anionic surfactant as well as about 10% of ethanol.

The following Examples serve to illustrate the invention. The parts and percentages are by weight, unless otherwise stated.

EXAMPLE 1

309 parts of 4'-nitro-4-aminodiphenylamine-2'-sulfonic acid are suspended at 80° C. in 2,500 parts of water. The addition of about 125 parts of 32% strength aqueous sodium hydroxide solution has the effect of converting the free acid into the sodium salt and of establishing pH 9.0. 75 parts of sodium hypochlorite in the form of an approximately 18% strength aqueous solution are then added dropwise at a temperature of about 80° C. and at a uniform rate in the course of 5 hours. The pH starts to rise, but is held at a value of 9 by adding a few parts of acetic acid. Stirring is continued at 80° C. for one hour, and the batch is then spray-dried.

The result is a dyestuff powder which dyes leather, even fresh full chrome grain leather, in a deep, slightly olive-tinged brown.

EXAMPLE 2

309 parts of 4'-nitro-4-aminodiphenylamine-2'-sulfonic acid are suspended in 1,600 parts of water, and half of the acid is converted into the sodium salt by adding 60.6 parts of aqueous 33% strength sodium hydroxide solution. The temperature is brought to 75° C. pH 6 becomes established. 75 parts of sodium hypochlorite in the form of an aqueous solution are then added at this temperature in the course of 4 hours. The pH is virtually unchanged. The batch is stirred for a further 2 hours at 75° C. and is then spray-dried.

The dyestuff powder obtained has equally good dyeing properties as that of Example 1; the hue is brownish olive.

EXAMPLE 3

Example 2 is repeated, except that the sodium hypochlorite solution is added fast, namely in the course of about 100 seconds. The pH rises to about 8, only to drop back again in the course of the subsequent stirring. Conventional working up gives a dyestuff powder which has equally good and advantageous dyeing properties as that of Example 1 or Example 2. It dyes leather in olive brown shades.

EXAMPLE 4

Example 1 is repeated, except that the sodium hypochlorite solution is replaced by an equivalent amount of potassium hypochlorite solution, affording a dyestuff powder which has the same dyeing properties as those of Example 1.

EXAMPLE 5

75 parts of sodium hypochlorite in the form of an aqueous solution are added in the course of 5 hours to a warm solution at 50° C. of 345 parts of the sodium salt of 4'-nitro-4-amino-3-methyldiphenylamine-2'-sulfonic acid in 1,600 parts of water. pH 8.0 is maintained by adding dilute sulfuric acid. The reaction is complete after about 3 hours; the resulting dyestuffs are then salted out at about 40° C. by means of about 20% by volume, relative to the volume of the batch, of sodium chloride. The precipitated dyestuff is filtered off with suction, is dried and is ground. It dyes leather, including in particular fresh chrome leather, in slightly reddish medium browns.

EXAMPLE 6

309 parts of 4'-nitro-4-aminodiphenylamine-2'-sulfonic acid are suspended in 2,200 parts of water at 85° C. 60.6 parts of 33% strength aqueous sodium hydroxide solution are added. pH 6 becomes established. 180 parts of potassium hypochlorite in the form of an aqueous solution are added at about 85° C. in the course of about 5 hours. Toward the end of the addition the pH rises to about 7. The temperature is maintained for a further two hours, and the batch is then cooled down and spray-dried. The dyestuff powder obtained dyes chrome-tanned leather in olive brown shades.

EXAMPLE 7

Example 1 is repeated, except that a temperature of about 95° C. is used, affording a dyestuff having equally good properties as that of Example 1.

EXAMPLE 8

Example 1 is repeated, except that the 4'-nitro-4-aminodiphenylamine-2'-sulfonic acid is replaced by an equivalent amount of 2'-nitro-3-aminodiphenylamine-4'-sulfonic acid, affording a dyestuff which dyes leather, including in particular fresh chrome-tanned leather, in a very yellowish light brown.

EXAMPLE 9

Example 1 is repeated, except that three times the amount of sodium hypochlorite is added, affording a dyestuff powder which dyes leather in yellowish light brown shades.

EXAMPLE 10

309 parts of 4'-nitro-4-aminodiphenylamine-2'-sulfonic acid are suspended in 2,400 parts of water at 20° C. About 125 parts of 32% strength aqueous sodium hydroxide solution are added, converting the free acid into the sodium salt and establishing pH 9.0. 37 parts of sodium hypochlorite in the form of a 20% strength aqueous solution or in the form of the pentahydrate are added in the course of 5 hours during which the temperature is held at 20° C. and the pH at 9.5 to 10 by adding about 30 parts of sodium hydrogencarbonate. The batch is subsequently stirred for about 15 hours and is then spray-dried.

The dyestuff powder obtained dyes chrome leather in slightly reddish medium-brown shades.

EXAMPLE 11

309 parts of 4'-nitro-4-aminodiphenylamine-2'-sulfonic acid are suspended in 2,500 parts of water at 20° C. 188 parts of 32% strength aqueous sodium hydroxide solution are added; the pH is then above 12. An aqueous solution of 75 parts of sodium hypochlorite are added in the course of 40 minutes during which the temperature is maintained at 20° C. by gentle cooling. The batch is subsequently stirred at 20° C. for 18 hours and is then spray-dried.

The dyestuff powder obtained dyes leather in yellowish brown shades.

EXAMPLE 12

Example 11 is repeated, except that the sodium hypochlorite solution is replaced by 70 parts of calcium hypochlorite, for example in the form of a 70% strength calcium hypochlorite product (corresponding to 101 parts) or in the form of chloride of lime, for example 192 parts of 37% strength chloride of lime. The result is a dyestuff powder of virtually equally good quality as that of Example 11.

EXAMPLE 13

309 parts of 4'-nitro-4-aminodiphenylamine-2'-sulfonic acid are dissolved by means of sodium hydroxide solution as described in Example 10. The solution is brought to a pH of 10.8 by adding 72 parts of disodium phosphate, 53 parts of sodium carbonate and 16 parts of 33% strength aqueous sodium hydroxide solution. At about 20° C. 75 parts of sodium hypochlorite in the form of an aqueous solution are added in the course of 30 minutes, and the temperature is allowed to rise to 35°-40° C. in the course of about four hours; the pH initially rises to 11.5 and then falls back again. The batch is subsequently stirred for 18 hours and is at the end at pH 10.5.

The batch is converted, by spray-drying, into a dyestuff powder which dyes leather in attractive medium-brown shades.

EXAMPLE 14

Example 1 is repeated, except that 3-chloro-4'-nitro-4-aminodiphenylamine-2'-sulfonic acid is used as the starting compound, affording a dyestuff powder which dyes leather in neutral brown shades.

EXAMPLE 15

Example 2 is repeated, except that 4'-nitro-4-amino-3-methoxydiphenylamine-2'-sulfonic acid is used, the pH rising from 5.6 to about 9 in the course of the addition of the sodium hypochlorite solution, affording a dyestuff powder which dyes leather in grayish brown shades.

EXAMPLE 16

Example 1 is repeated, except that 4-chloro-4'-nitro-3-aminodiphenylamine-2'-sulfonic acid is used as the starting compound, affording a dyestuff powder which dyes leather in slightly reddish brown shades.

EXAMPLE 17

Example 5 is repeated, except that 2',4'-di-nitro-4-aminodiphenylamine-2'-sulfonic acid is used as the starting compound, affording a dyestuff powder which dyes leather in weakly-reddish brown shades.

EXAMPLE 18

Example 1 is repeated, except that 4'-nitro-3-aminodiphenylamine-2'-sulfonic acid is used as the starting compound, affording a dyestuff powder which dyes leather in strongly greenish brown shades.

EXAMPLE 19

Example 5 is repeated, except that 2'-nitro-4-amino-3-methyldiphenylamine-4'-sulfonic acid is used as the starting compound, affording a dyestuff powder which dyes leather in reddish brown shades.

EXAMPLE 20

309 parts of 4'-nitro-4-aminodiphenylamine-2'-sulfonic acid are dissolved with sodium hydroxide solution as described in Example 10. 42.4 parts of sodium carbonate and 16.8 parts of sodium hydrogencarbonate are then added, the pH rising to 9.9. Afterwards technical sodium hypochlorite bleaching liquor is then added in the course of 40 minutes in an amount which corresponds to 93 parts of sodium hypochlorite; the temperature rises to about 35° C. and, after initially rising, the pH drops back to about 9.7 in the course of the subsequent approximately 15 hours of stirring at 40° C. The batch is spray-dried to produce the dyestuff powder which dyes leather in attractive yellowish-brown shades.

EXAMPLE 21

Example 20 is repeated, except that the reaction temperature used is 20° C., instead of 35°-40° C., affording a dyestuff product which likewise dyes leather in yellowish-brown shades.

EXAMPLE 22

Example 20 is repeated, except that 1.5 times the amount is used of each of sodium carbonate, sodium hydrogencarbonate and sodium hydroxide bleaching liquor, affording a dyestuff product which dyes leather in likewise attractive yellowish brown shades.

EXAMPLE 23

309 parts of 4'-nitro-4-aminodiphenylamine-2'-sulfonic acid are dissolved in water by means of sodium hydroxide solution as described in Example 10, and 42 parts of sodium hydrogencarbonate and 10.6 parts of sodium carbonate are added. Thereafter technical sodium hydroxide bleaching liquor is added in the course of two hours in an amount containing a total of 188 parts of sodium hypochlorite. The temperature rises to about 35° to 40° C.; after the chlorine bleach liquor has been added stirring is continued for an additional 15 hours without heating until the reaction has ended. The batch is spray-dried to produce a dyestuff powder which dyes leather in medium-brown shades.

USE EXAMPLE 1

The method for preparing a dyeing on boxcalf is as follows: 10 parts of calf leather (shaved weight) tanned with a commercially available chrome tannant is sweetened by drum agitation for 30 minutes in a bath comprising 30 parts of water, 0.04 part of sodium acetate and 0.04 part of sodium hydrogencarbonate. It is then placed in a fresh bath which comprises 30 parts of water and 0.05 part of an acid nitro dyestuff according to the invention and is agitated therein for 20 minutes; 0.2 part of an oil/fat liquor mixture and, 30 minutes later, 0.02 part of 85% strength aqueous formic acid are then added, the leather still being agitated therein. 30 minutes later the leather is taken out of the bath, is rinsed, is dried and is staked. The bath temperature is in each case about 50° C.

USE EXAMPLE 2

The method for preparing a dyeing on split velour is as follows: 5 parts of dry buffed chrome split sides are wetted back by drum agitation for 2 hours in a bath comprising 50 parts of water, 0.05 part of 25% strength aqueous ammonia and 0.04 part of tributylphenyl nonaglycol ether. The leather is then placed in a fresh bath of 40 parts of water, 0.04 part of 25% strength aqueous ammonia and 0.125 part of a dyestuff according to the invention and is agitated therein for 90 minutes. 0.1 part of a fat liquor and 30 minutes later 0.125 part of 85% strength aqueous formic acid are added, while the leather continues to be agitated. It is taken out of the bath 30 minutes later, is rinsed and is dried and is staked—the bath temperature is in each case about 50° C.

USE EXAMPLE 3

The method for preparing a dyeing on vegetable-tanned rechromed clothing velour leather is as follows: 5 parts of such leather from East Indian bastards are wetted back by drum treatment for 90 minutes in a bath of 50 parts of water combined with 0.05 part of 25% strength aqueous ammonia and 0.05 part of a nonylphenolpolyglycol ether (or of a similar nonionic surfactant). The bath is then dropped and replaced by a fresh one which consists of 40 parts of water and 0.25 part of a dyestuff according to the invention. The leather is agitated in this bath for 60 minutes; 0.125 part of a fat liquor is then added to the bath, followed 30 minutes later by 0.25 part of 85% strength aqueous formic acid, the leather still being agitated. 30 minutes later the leather is removed from the bath, is rinsed, is dried and is staked. The bath temperature is in each case about 50° C.

In all use examples the acid nitro dyestuffs (obtainable) according to the invention produce deep brown dyeings having good fastness properties.

I claim:

1. In a process for preparing acid nitro dyestuffs by treating an aminonitrodiphenylaminesulfonic acid with an oxidizing agent in an aqueous medium, the improvement consisting of reacting the aminonitrodiphenylaminesulfonic acid with hypochlorous acid or an alkali metal or alkaline earth metal salt of hypochlorous acid as the oxidizing agent or a mixture of these compounds, and carrying out the reaction at above pH 4 and at a temperature between 0 and 100° C.

2. The process according to claim 1, wherein the reaction is carried out at pH 5.5 to 12.0.

3. The process according to claim 1, wherein the hypochlorous acid or its salts are used in an amount of 0.2 to 3.5 moles per mole of aminonitrodiphenylaminesulfonic acid.

4. The process according to claim 2, wherein the hypochlorous acid or its salts are used in an amount of 0.2 to 3.5 moles per mole of aminonitrodiphenylaminesulfonic acid.

5. The process according to claim 1, wherein the starting aminonitrodiphenylaminesulfonic acid compound is a compound according to the formula

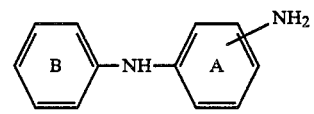

in which the primary amino group bonded to the benzene ring A is in the meta- or para-position relative to the secondary amino group and the benzene ring B is substituted by one or two nitro groups and one sulfo group which are bonded in ortho- and para-positions relative to the secondary amino group on ring B, and in which the benzene rings A and B can each be additionally substituted by one or two substituents selected from the group consisting of halogen, alkyl of 1 to 4 carbon atoms, alkoxy of 1 to 4 carbon atoms and carboxy.

6. The process according to claim 2, wherein the starting aminonitrodiphenylaminesulfonic acid compound is a compound according to the formula

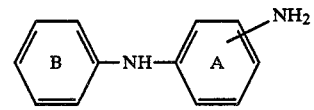

in which the primary amino group bonded to the benzene ring A is in the meta- or para-position relative to the secondary amino group and the benzene ring B is substituted by one or two nitro groups and one sulfo group which are bonded in ortho- and para-positions relative to the secondary amino group on ring B, and in which the benzene rings A and B can each be additionally substituted by one or two substituents selected from the group consisting of halogen, alkyl of 1 to 4 carbon atoms, alkoxy of 1 to 4 carbon atoms and carboxy.

7. The process according to claim 3, wherein the starting aminonitrodiphenylaminesulfonic acid compound is a compound according to the formula

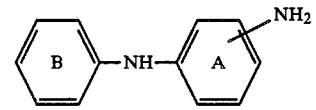

in which the primary amino group bonded to the benzene ring A is in the meta- or para-position relative to the secondary amino group and the benzene ring B is substituted by one or two nitro groups and one sulfo group which are bonded in ortho- and para-positions relative to the secondary amino group on ring B, and in which the benzene rings A and B can each be additionally substituted by one or two substituents selected from the group consisting of halogen, alkyl of 1 to 4 carbon atoms, alkoxy of 1 to 4 carbon atoms and carboxy.

8. The process according to claim 1, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 3-amino-2'-nitrodiphenylamine-4'-sulfonic acid or 3-amino-4'-nitrodiphenylamine-2'-sulfonic acid or a mixture of these compounds.

9. The process according to claim 2, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 3-amino-2'-nitrodiphenylamine-4'-sulfonic acid or 3-amino-4'-nitrodiphenylamine-2'-sulfonic acid or a mixture of these compounds.

10. The process according to claim 3, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 3-amino-2'-nitrodiphenylamine-4'-sulfonic acid or 3-amino-4'-nitrodiphenylamine-2'-sulfonic acid or a mixture of these compounds.

11. The process according to claim 1, wherein the starting aminonitrodiphenylaminesulfonic acid is a 4-amino-(nitrodiphenylamine)-sulfonic acid.

12. The process according to claim 2, wherein the starting aminonitrodiphenylaminesulfonic acid is a 4-amino-(nitrodiphenylamine)-sulfonic acid.

13. The process according to claim 3, wherein the starting aminonitrodiphenylaminesulfonic acid is a 4-amino-(nitrodiphenylamine)-sulfonic acid.

14. The process according to claim 1, wherein the oxidizing agent used is sodium hypochlorite.

15. The process according to claim 2, wherein the oxidizing agent used is sodium hypochlorite.

16. The process according to claim 3, wherein the oxidizing agent used is sodium hypochlorite.

17. The process according to claim 8, wherein the oxidizing agent used is sodium hypochlorite.

18. Acid nitro dyestuffs which have been obtained according to a process of claim 1.

* * * * *